(12) United States Patent
Akada et al.

(10) Patent No.: US 11,459,267 B2
(45) Date of Patent: Oct. 4, 2022

(54) GLASS PLATE

(71) Applicant: AGC Inc., Chiyoda-ku (JP)

(72) Inventors: Shuichi Akada, Tokyo (JP); Yuya Shimada, Tokyo (JP)

(73) Assignee: AGC Inc., Chiyoda-ku (JP)

(*) Notice: Subject to any disclaimer, the term of this patent is extended or adjusted under 35 U.S.C. 154(b) by 219 days.

(21) Appl. No.: 16/898,590

(22) Filed: Jun. 11, 2020

(65) Prior Publication Data

US 2020/0299181 A1   Sep. 24, 2020

Related U.S. Application Data

(63) Continuation of application No. PCT/JP2018/046836, filed on Dec. 19, 2018.

(30) Foreign Application Priority Data

Dec. 19, 2017  (JP) .............................. JP2017-242449

(51) Int. Cl.
  *C03C 3/095*  (2006.01)
  *C03C 3/087*  (2006.01)
  *C03C 4/08*   (2006.01)

(52) U.S. Cl.
  CPC .............. *C03C 3/095* (2013.01); *C03C 3/087* (2013.01); *C03C 4/085* (2013.01); *C03C 2204/00* (2013.01)

(58) Field of Classification Search
  CPC ......... C03C 3/095; C03C 3/087; C03C 4/085; C03C 2204/00
  See application file for complete search history.

(56) References Cited

U.S. PATENT DOCUMENTS

| 5,747,398 A | 5/1998 | Higby et al. |
| 2013/0306900 A1* | 11/2013 | Shimada ................... C03C 4/08 |
| | | 252/62 |
| 2014/0291593 A1* | 10/2014 | Shimada ................. C03C 4/085 |
| | | 252/586 |

FOREIGN PATENT DOCUMENTS

| JP | 08-217486 A | 8/1996 |
| WO | WO 2012/102176 A1 | 8/2012 |
| WO | WO 2013/111881 A1 | 8/2013 |

OTHER PUBLICATIONS

International Search Report dated Mar. 26, 2019 in PCT/JP2018/046836 filed on Dec. 19, 2018 citing documents AA-AB & AO-AQ therein, 2 pages.

* cited by examiner

*Primary Examiner* — Karl E Group
*Assistant Examiner* — Cameron K Miller
(74) *Attorney, Agent, or Firm* — Oblon, McClelland, Maier & Neustadt, L.L.P.

(57) ABSTRACT

A glass sheet contains, as represented by mass percentage based on oxides, $SiO_2$: 65-75%, $Al_2O_3$: 0-20%, MgO: 0-5%, CaO: 2-20%, $Na_2O$: 5-20%, $K_2O$: 0-10%, total iron in terms of $Fe_2O_3$ (t-$Fe_2O_3$): 0.2-1.0%, $TiO_2$: 0.65-1.5%, and $CeO_2$: 0.1-2.0%. A ratio of the content of MgO to RO is 0.20 or less, where RO is a total amount of MgO, CaO, SrO and BaO. Fe-redox is from 30 to 57%. The glass sheet has a visible light transmittance Tv_A of 65% or more, a solar transmittance Te of 50% or less, and a dominant wavelength Dw of transmitted light of from 508 to 580 nm, in terms of a 3.9-mm thickness of the glass sheet. A value of A=([t-$Fe_2O_3$]×Fe-redox)/[$TiO_2$] is from 20 to 40, where [t-$Fe_2O_3$] is the content of t-$Fe_2O_3$ and [$TiO_2$] is the content of $TiO_2$.

14 Claims, No Drawings

GLASS PLATE

TECHNICAL FIELD

The present invention relates to a glass sheet.

BACKGROUND ART

As the window glass of a vehicle, etc. including an automobile, use of a glass having high heat insulating property is required. Because, when the heat insulating property is low, not only the temperature inside a vehicle receiving solar radiation rises to cause discomfort to the occupant but also the cooling load increases, leading to a reduction in the fuel efficiency.

The index of the heat insulating property of glass includes a solar transmittance (Te) specified in ISO-9050 (2003), and as the Te is lower, this means that the heat insulating property is higher.

From the viewpoint of ensuring visibility and safety, the window glass of a vehicle, etc. is also required to have high visible light transmittance. The index of the visible light transmittance includes a visible light transmittance (Tv_A) specified in JIS R3106 (1998).

In Patent Literature 1, a heat-absorbing glass sheet having a low Te has been proposed.

CITATION LIST

Patent Literature

Patent Literature 1: International Publication No. 2012/102176

SUMMARY OF INVENTION

Technical Problem

The window glass of a vehicle, etc. tends to prefer a glass sheet in which the hue of transmitted light has a yellow-green hue that is more natural when a passenger sees a scenery through the glass sheet. In all heat-absorbing glass sheets described in Examples of Patent Literature 1, the dominant wavelength serving as an index of hue was 505 nm or less, and the color of transmitted light was green.

The present invention provides a glass sheet allowing transmitted light to have a yellow-green hue while satisfying low solar transmittance and high visible light transmittance at the same time.

Solution to Problem

The glass sheet of the present invention contains, as represented by mass percentage based on oxides:
SiO$_2$: from 65 to 75%,
Al$_2$O$_3$: from 0 to 20%,
MgO: from 0 to 5%,
CaO: from 2 to 20%,
Na$_2$O: from 5 to 20%,
K$_2$O: from 0 to 10%,
total iron in terms of Fe$_2$O$_3$: from 0.2 to 1.0%, and
TiO$_2$: from 0.65 to 1.5%,
has a ratio (MgO/RO) of the content of MgO to RO of 0.20 or less, denoting RO as a total amount of MgO, CaO, SrO and BaO as represented by mass percentage based on oxides,
has a mass ratio of divalent iron in terms of Fe$_2$O$_3$ to the total iron in terms of Fe$_2$O$_3$ of from 30 to 57%,
has a visible light transmittance Tv_A specified in JIS R 3106 (1998) of 65% or more in terms of a 3.9-mm thickness of the glass sheet,
has a solar transmittance Te specified in ISO-9050 (2003) of 50% or less in terms of a 3.9-mm thickness of the glass sheet, and
has a dominant wavelength Dw of transmitted light specified in JIS Z 8701 (1999) of from 508 to 580 nm in terms of a 3.9-mm thickness of the glass sheet.

Advantageous Effects of Invention

The glass sheet of the present invention allows transmitted light to have a yellow-green hue while satisfying low solar transmittance and high visible light transmittance at the same time.

DESCRIPTION OF EMBODIMENTS

The terms used in the present description are described. Unless specified otherwise, the definitions of the terms presented below apply throughout the present description and claims.

A numerical range indicated using "to" means that the numerical values described before and after it are included as a lower limit value and an upper limit value, respectively.

The content of total iron is expressed as the amount of Fe$_2$O$_3$, but the iron existing in glass does not all exist as trivalent ion (Fe$^{3+}$), and divalent iron (Fe$^{2+}$) also exists. The mass ratio (percentage) of divalent iron in terms of Fe$_2$O$_3$ to the total iron in terms of Fe$_2$O$_3$ is referred to as Fe-redox.

The Fe-redox is calculated according to the following formula (1):

$$\text{Fe-redox (\%)} = 1.255 \times \log_{10}(92/T_{1000\,nm})/([t\text{-Fe}_2O_3] \times t) \times 100 \qquad \text{formula (1)}$$

In the formula, $T_{1000\,nm}$ is the transmittance (unit: %) of the glass sheet at a wavelength of 1,000 nm, t is the thickness (unit: mm) of the glass sheet, and [t-Fe$_2$O$_3$] is the total iron content (unit: mass %) in terms of Fe$_2$O$_3$.

The visible light transmittance Tv_A is a visible light transmittance calculated by measuring transmittance by means of a spectrophotometer in conformity with JIS R 3106 (1998). Pre-calculated weighting functions use values of standard Illuminant A and 2° visual field. In the present description, the visible light transmittance is indicated by a value in terms of a 3.9-mm sheet thickness.

The value in terms of a 3.9-mm sheet thickness as used herein means a value obtained by measuring a refractive index of a glass sheet, of which transmittance has been measured, and converting the value (here, the visible light transmittance Tv_A) of the glass sheet, in consideration of multiple reflection, into a value in terms of a 3.9-mm sheet thickness by use of the reflectivity of the glass sheet calculated from the refractive index according to Sellmeier equation.

The solar transmittance Te is specified in ISO-9050 (2003). In the present description, this is indicated by a value in terms of a 3.9-mm sheet thickness.

The ultraviolet transmittance Tuv is an ultraviolet transmittance calculated by measuring a transmittance by means of a spectrophotometer in accordance with ISO-9050 (2003). In the present description, this is indicated by a value in terms of a 3.9-mm sheet thickness.

The L*a*b* color space is based on the standard of JIS Z 8781-4 (2013) (using standard Illuminant D65 and 10° visual field). X, Y and Z coordinates (XYZ color system) are determined from the transmittance spectrum of a glass sample, and these can be converted into a*b* coordinates. In the present description, this is indicated by a value in terms of a 3.9-mm sheet thickness.

The excitation purity Pe is an excitation purity determined in accordance with JIS Z 8701 (1999). In the present description, this is indicated by a value in terms of a 3.9-mm sheet thickness.

The dominant wavelength Dw of transmitted light is a dominant wavelength of transmitted light calculated in accordance with JIS Z 8701 (1999). In the present description, this is indicated by a value in terms of a 3.9-mm sheet thickness. Pe and Dw are values of standard Illuminant C and 2° visual field.

In the following, each component and properties of the glass sheet of an embodiment of the present invention are described.

The glass sheet of an embodiment of the present invention contains, as represented by mass percentage based on oxides:

$SiO_2$: from 65 to 75%,
$Al_2O_3$: from 0 to 20%,
MgO: from 0 to 5%,
CaO: from 2 to 20%,
$Na_2O$: from 5 to 20%, and
$K_2O$: from 0 to 10%.

$SiO_2$ is a main component of the glass sheet.

When the content of $SiO_2$ is 65% or more, good weather resistance is obtained. The content of $SiO_2$ is preferably 67% or more, more preferably 68% or more, still more preferably 69% or more, especially preferably 70% or more. When the content of $SiO_2$ is 75% or less, devitrification is less likely to occur. The content of $SiO_2$ is preferably 74% or less, more preferably 73% or less, especially preferably 72% or less.

$Al_2O_3$ is a component that enhances the weather resistance.

The content of $Al_2O_3$ is 0% or more. When $Al_2O_3$ is contained, the weather resistance is improved. The content of $Al_2O_3$ is preferably 0.3% or more, more preferably 0.5% or more, still more preferably 1% or more, especially preferably 2% or more, and most preferably 3% or more. When the content of $Al_2O_3$ is 20% or less, the meltability is improved. The content of $Al_2O_3$ is preferably 10% or less, more preferably 5% or less, still more preferably 4% or less, especially preferably 3.5% or less.

MgO is a component that accelerates the melting of glass raw materials and improves weathering resistance.

The content of MgO is 0% or more. When MgO is contained, the meltability and weather resistance are improved. The content of MgO may be 0.1% or more, may be 0.2% or more, may be 0.3% or more, or may be 0.5% or more. When the content of MgO is 5% or less, devitrification is less likely to occur. In the glass sheet where the content of MgO is 5% or less, Te is low compared, in terms of the same Tv_A, with a glass sheet in which the content of MgO is more than 5%. Accordingly, when the content of MgO is 5% or less, the solar transmittance can be reduced without impairing visible light transmittance. The content of MgO is preferably 3% or less, more preferably 1% or less, still more preferably 0.5% or less, especially preferably 0.3% or less, and it is most preferable that MgO is substantially not contained. The phrase "substantially not contained" means that MgO is not contained except for being mixed as an unavoidable impurity and specifically, means that the content thereof is 0.1 mass % or less, preferably 0.05% or less, more preferably 0.03% or less.

CaO is a component that accelerates the melting of glass raw materials and improves weathering resistance.

When the content of CaO is 2% or more, the meltability and weather resistance are improved. The content of CaO is preferably 5% or more, more preferably 8% or more, still more preferably 8.5% or more, especially preferably 8.8% or more. When the content of CaO is 20% or less, devitrification is less likely to occur. The content of CaO is preferably 15% or less, more preferably 12% or less, still more preferably 11% or less, especially preferably 10% or less, and most preferably 9.5% or less.

$Na_2O$ is a component that accelerates the melting of glass raw materials.

When the content of $Na_2O$ is 5% or more, good meltability is obtained. The content of $Na_2O$ is preferably 8% or more, more preferably 11% or more, still more preferably 13% or more, especially preferably 13.5% or more, and most preferably 14% or more. When the content of $Na_2O$ is 20% or less, good weather resistance is obtained. The content of $Na_2O$ is preferably 18% or less, more preferably 17% or less, still more preferably 16% or less, especially preferably 15% or less.

$K_2O$ is a component that accelerates the melting of glass raw materials.

The content of $K_2O$ is 0% or more. When $K_2O$ is contained, the meltability is improved. The content of $K_2O$ is preferably 0.1% or more, more preferably 0.3% or more, still more preferably 0.5% or more, especially preferably 1.0% or more, and most preferably 1.3% or more. When the content of $K_2O$ is 10% or less, the weather resistance is improved. The content of $K_2O$ is preferably 5% or less, more preferably 3% or less, still more preferably 2% or less, especially preferably 1.8% or less.

The glass sheet of an embodiment of the present invention may contain SrO so as to accelerate the melting of glass raw materials. In the case of containing SrO, the content of SrO is, as represented by mass percentage based on oxides, preferably 5% or less, more preferably 3% or less, still more preferably 1% or less, especially preferably 0.5% or less, and it is most preferable that SrO is substantially not contained. The phrase "substantially not contained" means that SrO is not contained except for being mixed as an unavoidable impurity, and specifically, means that the content thereof is 0.1 mass % or less, preferably 0.05% or less, more preferably 0.03% or less. When the content of SrO is 5% or less, devitrification is less likely to occur.

The glass sheet of an embodiment of the present invention may contain BaO so as to accelerate the melting of glass raw materials. In the case of containing BaO, the content of BaO is, as represented by mass percentage based on oxides, preferably 5% or less, more preferably 3% or less, still more preferably 1% or less, especially preferably 0.5% or less, and it is most preferable that BaO is substantially not contained. The phrase "substantially not contained" means that BaO is not contained except for being mixed as an unavoidable impurity and specifically, means that the content thereof is 0.1 mass % or less, preferably 0.05% or less, more preferably 0.03% or less. In addition, when the content of BaO is 5% or less, devitrification is less likely to occur.

In the glass sheet of an embodiment of the present invention, denoting RO as the total amount of MgO, CaO, SrO and BaO as represented by mass percentage based on oxides, the ratio (MgO/RO) of the content of MgO to RO is 0.20 or less. In the glass sheet where MgO/RO is 0.20 or less, Te is low compared, in terms of the same Tv_A, with a glass sheet in which MgO/RO is more than 0.20. Accordingly, when MgO/RO is 0.20 or less, the solar transmittance can be reduced without impairing visible light transmittance. MgO/RO is preferably 0.15 or less, more preferably 0.10 or less, still more preferably 0.07 or less, yet still more preferably 0.05 or less, even yet still especially preferably 0.03 or less, and most preferably 0.01 or less.

The glass sheet of an embodiment of the present invention contains iron (Fe). Iron has the action of reducing Te and Tv_A and also acts as a coloring component of blue, green or yellow. The window glass of a vehicle, etc. is required to have a low Te, but a reduction of Tv_A is undesirable. Therefore, it has been conventionally difficult to determine the balance with other components and other factors and find an optimum range of the Fe content.

In the glass sheet of an embodiment of the present invention, the content of total iron (hereinafter, sometimes referred to as t-$Fe_2O_3$) in terms of $Fe_2O_3$ is from 0.2 to 1.0% as represented by mass % based on oxides. When the content of t-$Fe_2O_3$ is 0.2% or more, Te can be sufficiently reduced. The content of t-$Fe_2O_3$ is preferably 0.3% or more, more preferably 0.4% or more, still more preferably 0.45% or more, especially preferably 0.5% or more, and most preferably 0.55% or more. When the content of t-$Fe_2O_3$ is 1.0% or less, Tv_A can be sufficiently increased. The content of t-$Fe_2O_3$ is preferably 0.9% or less, more preferably 0.85% or less, still more preferably 0.8% or less, yet still more preferably 0.75% or less, even yet still more preferably 0.7% or less, especially preferably 0.65% or less, and most preferably 0.6% or less.

In the glass sheet of an embodiment of the present invention, the Fe-redox is from 30 to 57%. When the Fe-redox is 30% or more, Te can be sufficiently reduced. The Fe-redox is preferably 35% or more, more preferably 40% or more, still more preferably 42% or more, yet still more preferably 45% or more, especially preferably 47% or more, and most preferably 50% or more. On the other hand, when the Fe-redox is 57% or less, the glass melting step does not become complicated, and the number of bubbles contained in the glass is small. In addition, a glass sheet having a yellow-green hue is obtained. The Fe-redox is preferably 56% or less, more preferably 55% or less, still more preferably 54% or less, especially preferably 53% or less. It is understood by one skilled in the art that the Fe-redox can be adjusted, for example, by adjusting the amount of a reducing agent or oxidizing agent added.

The glass sheet of an embodiment of the present invention contains, as represented by mass percentage based on oxides, from 0.65 to 1.5% of $TiO_2$. $TiO_2$ has the action of reducing Te and Tv_A and also acts as a coloring component of green or yellow. In other words, this is an essential component for obtaining a yellow-green hue. The window glass of a vehicle, etc. is required to have a low Te, but a reduction of Tv_A is undesirable. Therefore, it has been conventionally difficult to determine the balance with other components and other factors and find an optimum range of the $TiO_2$ content.

When the content of $TiO_2$ is 0.65% or more, a glass sheet having the target yellow-green hue is obtained by adjusting the content of $Fe_2O_3$ and the Fe-redox. The content of $TiO_2$ is preferably 0.70% or more, more preferably 0.75% or more, still more preferably 0.78% or more, especially preferably 0.80% or more. When the content of $TiO_2$ is 1.5% or less, Tv_A is not excessively reduced. The content of $TiO_2$ is preferably 1.2% or less, more preferably 1.0% or less, still more preferably 0.95% or less, especially preferably 0.90% or less, and most preferably 0.85% or less.

In the glass sheet of an embodiment of the present invention, the ratio (t-$Fe_2O_3$/$TiO_2$) of the content of t-$Fe_2O_3$ to the content of $TiO_2$ as represented by mass percentage based on oxides is preferably from 0.3 to 1.1. When t-$Fe_2O_3$/$TiO_2$ is from 0.3 to 1.1, Tv_A is not excessively reduced, and a glass sheet having the target yellow-green hue is readily obtained. The t-$Fe_2O_3$/$TiO_2$ is more preferably 0.5 or more, still more preferably 0.6 or more, especially preferably 0.65 or more, and most preferably 0.68 or more. t-$Fe_2O_3$/$TiO_2$ is more preferably 1.0 or less, still more preferably 0.9 or less, especially preferably 0.8 or less, and most preferably 0.75 or less.

In the glass sheet of an embodiment of the present invention, A represented by the following formula (2) is preferably from 20 to 50. When A is from 20 to 50, Tv_A is not excessively reduced, and a glass sheet having the target yellow-green hue is readily obtained.

$$A = ([t\text{-}Fe_2O_3] \times Fe\text{-redox})/[TiO_2] \quad \text{formula (2)}$$

[t-$Fe_2O_3$] is the content (unit: mass %) of t-$Fe_2O_3$. Fe-redox is the mass ratio (unit:%) of divalent iron in terms of $Fe_2O_3$ to the total iron in terms of $Fe_2O_3$ and is calculated according to formula (1), and [$TiO_2$] is the content (unit: mass %) of $TiO_2$. A is more preferably 25 or more, still more preferably 30 or more, especially preferably 33 or more, and most preferably 35 or more. A is more preferably 45 or less, still more preferably 42 or less, especially preferably 40 or less, and most preferably 38 or less.

The glass sheet of an embodiment of the present invention may contain $CeO_2$. $CeO_2$ provides the action of reducing ultraviolet transmittance.

In the glass sheet of an embodiment of the present invention, in the case of containing $CeO_2$, the content of $CeO_2$ is, as represented by mass % based on oxides, preferably 0.1% or more, more preferably 0.4% or more, still more preferably 0.7% or more, especially preferably 1.0% or more, and most preferably 1.2% or more. Since $CeO_2$ is expensive and if its amount is too large, visible light transmittance decreases, the content of $CeO_2$ is preferably 2.0% or less, more preferably 1.8% or less, still more preferably 1.5% or less, especially preferably 1.4% or less, and most preferably 1.3% or less The glass sheet of an embodiment of the present invention may contain $SO_3$. $SO_3$ is mainly derived from salt cake ($Na_2SO_4$) used as a refining agent.

In the glass sheet of an embodiment of the present invention, the content of $SO_3$ is, as represented by mass % based on oxides, preferably from 0.001 to 0.2%. When the content of $SO_3$ is 0.001% or more, the refining effect during glass melting is improved, and the number of bubbles decreases. The content of $SO_3$ is preferably 0.003% or more, more preferably 0.01% or more, still more preferably 0.02% or more. When the content of $SO_3$ is 0.2% or less, the gas component of $SO_2$ is less likely to remain as gas bubbles in the glass. The content of $SO_3$ is preferably 0.1% or less, more preferably 0.05% or less, still more preferably 0.03% or less.

The glass sheet of an embodiment of the present invention may contain $SnO_2$. $SnO_2$ acts as a refining agent. $SnO_2$ also acts as an oxidizing agent and therefore, contributes to the adjustment of Fe-redox.

In the glass sheet of an embodiment of the present invention, the content of $SnO_2$ is, as represented by mass % based on oxides, preferably from 0.02 to 1%. When the content of $SnO_2$ is 0.02% or more, the fining effect during glass melting is improved, and the number of bubbles decreases. The content of $SnO_2$ may be 0.1% or more, may be 0.2% or more, or may be 0.3% or more. When the content of $SnO_2$ is 1% or less, the raw material cost can be reduced, and volatilization in production line is less likely to occur. The content of $SnO_2$ is more preferably 0.7% or less, still more preferably 0.5% or less, especially preferably 0.4% or less.

The glass sheet of an embodiment of the present invention may contain, other than those described above, an additional coloring component, for example, CoO, Se, $MnO_2$, MnO, $Cr_2O_3$, $V_2O_5$, NiO and $Er_2O_3$, but need not contain an additional coloring component. The glass sheet of an embodiment of the present invention is preferably, as represented by mass % based on oxides, $MnO_2$, MnO, $Cr_2O_3$, $V_2O_5$, NiO and $Er_2O_3$ are substantially not contained. The phrase "substantially not contained" means that such a component is not contained except for being mixed as an unavoidable impurity and specifically, means that the content CoO is 0.0010 mass % or less, preferably 0.0005% or less, more preferably 0.0001% or less, still more preferably 0.00001% or less, the content of Se is 0.0010% or less, preferably 0.0005% or less, more preferably 0.0001% or less, still more preferably 0.00001% or less, the total of the contents of $MnO_2$ and MnO is 0.0015% or less, preferably 0.001% or less, more preferably 0.0005% or less, each of the contents of $Cr_2O_3$ and NiO is 0.0015% or less, preferably 0.001% or less, more preferably 0.0005% or less, the content of $V_2O_5$ is 0.01% or less, preferably 0.005% or less, more preferably 0.003% or less, and the content of $Er_2O_3$ is 0.008% or less, preferably 0.005% or less, more preferably 0.003% or less.

The visible light transmittance Tv_A of the glass sheet of an embodiment of the present invention is 65% or more in terms of a 3.9-mm thickness of the glass sheet. Tv_A is, in terms of a 3.9-mm thickness of the glass sheet, preferably 70% or more, more preferably 72% or more. The upper limit of Tv_A is not particularly limited but, in terms of a 3.9-mm thickness of the glass sheet, may be 90% or less, may be 80% or less, or may be 78% or less.

The solar transmittance Te of the glass sheet of an embodiment of the present invention is 50% or less in terms of a 3.9-mm thickness of the glass sheet. The Te is, in terms of a 3.9-mm thickness of the glass sheet, preferably 48% or less, more preferably 46% or less, still more preferably 44% or less, especially preferably 42% or less, and most preferably 40% or less. The lower limit of Te is not particularly limited but, in terms of a 3.9-mm thickness of the glass sheet, may be 25% or more, may be 28% or more, may be 30% or more, or may be 32% or more.

The window glass of a vehicle, etc. also fulfills a role of protecting a human body or fixture in a vehicle from ultraviolet rays. The ultraviolet transmittance Tuv of the glass sheet of an embodiment of the present invention is, in terms of a 3.9-mm thickness of the glass sheet, preferably 20% or less, more preferably 15% or less, still more preferably 13% or less, especially preferably 12% or less, and most preferably 11% or less. The lower limit of Tuv is not particularly limited but, in terms of a 3.9-mm thickness of the glass sheet, may be 1% or more, may be 3% or more, may be 4% or more, or may be 5% or more.

The dominant wavelength Dw of transmitted light of the glass sheet of an embodiment of the present invention is, in terms of a 3.9-mm thickness of the glass sheet, from 508 to 580 nm. When Dw is from 508 to 580 nm, a glass sheet having the target yellow-green hue is obtained. Dw is preferably 510 nm or more, more preferably 512 nm or more, still more preferably 513 nm or more, especially preferably 515 nm or more. Dw may be 520 nm or more, may be 530 nm or more, or may be 540 nm or more. Dw is preferably 570 nm or less, more preferably 560 nm or less, still more preferably 550 nm or less, especially preferably 540 nm or less, and most preferably 530 nm or less. Dw may be 525 nm or less or may be 520 nm or less.

The excitation purity Pe of the glass sheet of an embodiment of the present invention is, in terms of a 3.9-mm thickness of the glass sheet, preferably 20% or less. Pe is more preferably 15% or less, still more preferably 10% or less, especially preferably 5% or less, and most preferably 3% or less. The lower limit of Pe is not particularly limited but, in terms of a 3.9-mm thickness of the glass sheet, may be 0.5% or more, may be 1.0% or more, may be 2.0% or more, or may be 2.5% or more.

In the glass sheet of an embodiment of the present invention, the a* in the L*a*b* color space is, in terms of a 3.9-mm thickness of the glass sheet, preferably from −13.5 to −8. The a* may be −12 or more, may be −11 or more, or may be −10 or more. The a* may be −9 or less or may be −9.5 or less.

The b* is, in terms of a 3.9-mm thickness of the glass sheet, preferably from 2 to 8. The b* may be 2.5 or more or may be 3 or more. The b* may be 6 or less, may be 5 or less, or may be 4 or less.

It is preferred that, in terms of a 3.9-mm thickness of the glass sheet, the a* is from −11 to −9 and the b* is from 3 to 4.

The L* is, in terms of a 3.9-mm thickness of the glass sheet, preferably from 85 to 90. The L* may be 86 or more or may be 88 or more. The L* may be 89 or less.

The glass sheet of the present invention can be used for both vehicles and buildings and is suitable, among others, as a windshield, door glass, rear glass, roof glass, etc. for automobiles. In the case of being used as a window glass for automobiles, the glass sheet is used, if desired, as a laminated glass formed by laminating a plurality of glass sheets via an interlayer film, a glass formed by processing a flat glass into a curved glass, or a strengthened glass. In the case of being used as an architectural double layer glass, the glass sheet is used as a double layer glass composed of two glass sheets of the present invention or as a double layer glass of the glass sheet of the present invention and another glass sheet.

The glass sheet of an embodiment of the present invention is produced, for example, through the following steps (i) to (v) in order.

(i) A glass raw material is prepared by mixing silica sand, other glass matrix composition raw materials, a coloring component raw material such as iron source and titanium source, a reducing agent, a refining agent, etc. to afford the target glass composition.

(ii) The glass raw material is continuously supplied to a melting furnace, heated at approximately from 1,400 to 1,600° C. (for example, about 1,500° C.) by heavy oil, etc., and melted to make a molten glass.

(iii) The molten glass is refined and then formed into a glass sheet having a predetermined thickness by a glass sheet forming method such as float process.

(iv) The glass sheet is annealed and then cut into a predetermined size to obtain the glass sheet of an embodiment of the present invention.

(v) If desired, the cut glass sheet may be subjected to a strengthening treatment, may be processed into a laminated glass, or may be processed into a double layer glass.

The glass matrix composition raw materials include those commonly used as raw materials of normal soda lime silica glass, such as silica sand, soda ash, limestone and feldspar.

The iron source includes iron powder, iron oxide powder, red iron oxide, etc.

The titanium source includes titanium oxide, etc.

The cerium source includes cerium oxide, etc.

The reducing agent includes carbon, coke, etc. The reducing agent is used to prevent oxidation of iron in the molten glass and thereby adjust the ratio to the target Fe-redox.

$SnO_2$ may be used as the reducing agent or refining agent, and $SO_3$ may be used as the refining agent.

Examples

The embodiments of the present invention are specifically described below by referring to Examples, but the present invention is not limited to these Examples.

Ex. 1 to 45 and 47 to 49 are Working Examples of the present invention, and Ex. 46, 50 and 51 are Comparative Examples. Ex. 46 corresponds to Ex. 1 described in Patent Literature 1.

Raw materials were put in a platinum crucible so as to afford the glass composition shown in Tables 1 to 5 below and melted at 1,480° C. for 3 hours. After the melting, the melt was cast on a carbon plate and slowly cooled to manufacture a glass sheet. Both surfaces of the glass sheet manufactured were polished to obtain a glass sheet having a thickness of 3.9 mm.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| mass % | $SiO_2$ | 69.7 | 69.8 | 69.6 | 69.4 | 69.5 | 69.8 | 69.6 | 70.0 | 69.2 | 69.6 | 69.3 | 69.5 |
| mass % | $Al_2O_3$ | 3.2 | 3.1 | 3.2 | 3.2 | 3.2 | 3.2 | 3.2 | 3.2 | 3.2 | 3.2 | 3.2 | 3.2 |
| mass % | MgO | 0.05 | 0.05 | 0.04 | 0.04 | 0.04 | 0.04 | 0.04 | 0.04 | 0.05 | 0.04 | 0.04 | 0.04 |
| mass % | CaO | 8.9 | 8.9 | 8.9 | 8.9 | 8.9 | 8.9 | 8.8 | 8.7 | 9.0 | 8.8 | 9.0 | 8.9 |
| mass % | $Na_2O$ | 14.4 | 14.4 | 14.5 | 14.6 | 14.5 | 14.2 | 14.4 | 14.3 | 14.6 | 14.5 | 14.5 | 14.5 |
| mass % | $K_2O$ | 1.5 | 1.5 | 1.5 | 1.5 | 1.5 | 1.5 | 1.5 | 1.5 | 1.5 | 1.5 | 1.5 | 1.5 |
| mass % | $SO_3$ | 0.06 | 0.05 | 0.03 | 0.03 | 0.05 | 0.04 | 0.03 | 0.03 | 0.04 | 0.04 | 0.03 | 0.03 |
| mass % | t-$Fe_2O_3$ | 0.61 | 0.61 | 0.61 | 0.66 | 0.66 | 0.67 | 0.71 | 0.57 | 0.58 | 0.60 | 0.61 | 0.61 |
| mass % | $TiO_2$ | 0.81 | 0.81 | 0.82 | 0.82 | 0.82 | 0.82 | 0.82 | 0.89 | 1.08 | 0.81 | 0.81 | 0.81 |
| mass % | $CeO_2$ | 0.84 | 0.84 | 0.84 | 0.85 | 0.85 | 0.85 | 0.85 | 0.83 | 0.83 | 1.03 | 1.04 | 1.03 |
| | MgO/RO | 0.006 | 0.006 | 0.004 | 0.004 | 0.004 | 0.004 | 0.005 | 0.005 | 0.006 | 0.005 | 0.004 | 0.004 |
| | t-$Fe_2O_3$/$TiO_2$ | 0.752 | 0.751 | 0.744 | 0.807 | 0.810 | 0.811 | 0.868 | 0.644 | 0.535 | 0.746 | 0.753 | 0.748 |
| % | A | 29.5 | 34.0 | 39.7 | 42.3 | 31.6 | 37.3 | 48.1 | 35.6 | 26.7 | 33.8 | 38.1 | 40.3 |
| % | Fe-redox | 39.2 | 45.3 | 53.4 | 52.4 | 39.0 | 46.0 | 55.4 | 55.3 | 49.8 | 45.3 | 50.6 | 53.9 |
| % | Tv_A | 75.0 | 73.3 | 71.2 | 69.8 | 73.5 | 71.4 | 67.5 | 71.8 | 72.4 | 73.3 | 71.7 | 71.2 |
| % | Te | 46.2 | 43.1 | 39.7 | 38.1 | 44.1 | 40.6 | 35.4 | 40.3 | 41.6 | 43.1 | 40.6 | 39.6 |
| % | Tuv | 13.7 | 13.7 | 13.7 | 12.7 | 12.7 | 12.7 | 12.1 | 13.7 | 11.9 | 12.2 | 11.9 | 12.2 |
| nm | Dw | 530.8 | 518.4 | 509.7 | 510.6 | 532.4 | 519.5 | 508.7 | 513.3 | 535.0 | 523.2 | 515.6 | 511.9 |
| % | Pe | 2.7 | 2.5 | 3.0 | 3.1 | 3.1 | 2.8 | 3.6 | 2.8 | 3.6 | 2.7 | 2.8 | 2.9 |
| | L* | 89.9 | 89.3 | 88.4 | 87.8 | 89.3 | 88.4 | 86.7 | 88.7 | 88.8 | 89.3 | 88.6 | 88.4 |
| | a* | −8.2 | −9.1 | −10.3 | −10.8 | −8.8 | −9.9 | −11.9 | −10.1 | −9.8 | −9.1 | −10.0 | −10.3 |
| | b* | 4.0 | 3.5 | 3.0 | 3.3 | 4.4 | 3.9 | 3.3 | 3.4 | 5.1 | 3.9 | 3.6 | 3.3 |

TABLE 2

| | | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|---|
| mass % | $SiO_2$ | 69.5 | 69.4 | 69.3 | 69.6 | 69.4 | 69.2 | 69.2 | 69.3 | 69.3 | 69.1 | 70.7 | 70.5 |
| mass % | $Al_2O_3$ | 3.2 | 3.2 | 3.2 | 3.2 | 3.2 | 3.2 | 3.2 | 3.2 | 3.2 | 3.2 | 3.2 | 3.2 |
| mass % | MgO | 0.04 | 0.04 | 0.04 | 0.04 | 0.04 | 0.04 | 0.04 | 0.04 | 0.04 | 0.04 | 0.04 | 0.04 |
| mass % | CaO | 8.9 | 8.9 | 8.9 | 8.8 | 8.9 | 8.9 | 9.0 | 8.9 | 9.0 | 9.0 | 8.7 | 8.6 |
| mass % | $Na_2O$ | 14.4 | 14.5 | 14.6 | 14.4 | 14.5 | 14.6 | 14.5 | 14.4 | 14.5 | 14.5 | 13.5 | 13.6 |
| mass % | $K_2O$ | 1.5 | 1.5 | 1.5 | 1.5 | 1.5 | 1.5 | 1.5 | 1.5 | 1.5 | 1.5 | 1.5 | 1.5 |
| mass % | $SO_3$ | 0.04 | 0.03 | 0.04 | 0.03 | 0.04 | 0.02 | 0.04 | 0.03 | 0.04 | 0.04 | 0.02 | 0.02 |
| mass % | t-$Fe_2O_3$ | 0.58 | 0.58 | 0.61 | 0.61 | 0.56 | 0.57 | 0.58 | 0.58 | 0.58 | 0.58 | 0.56 | 0.56 |
| mass % | $TiO_2$ | 0.80 | 0.81 | 0.81 | 0.80 | 0.80 | 0.81 | 0.81 | 0.81 | 0.85 | 0.90 | 0.80 | 0.80 |

TABLE 2-continued

|  |  | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|---|
| mass % | $CeO_2$ | 1.13 | 1.14 | 1.13 | 1.13 | 1.23 | 1.23 | 1.24 | 1.24 | 1.13 | 1.14 | 1.22 | 1.22 |
|  | MgO/RO | 0.004 | 0.004 | 0.004 | 0.005 | 0.004 | 0.004 | 0.004 | 0.004 | 0.004 | 0.004 | 0.005 | 0.005 |
|  | t-$Fe_2O_3$/$TiO_2$ | 0.724 | 0.716 | 0.748 | 0.758 | 0.705 | 0.699 | 0.717 | 0.717 | 0.681 | 0.646 | 0.698 | 0.701 |
|  | A | 36.5 | 39.0 | 36.8 | 35.4 | 33.8 | 37.0 | 32.7 | 40.6 | 33.5 | 30.7 | 38.2 | 34.3 |
| % | Fe-redox | 50.5 | 54.4 | 49.1 | 46.8 | 47.9 | 53.0 | 45.5 | 56.6 | 49.1 | 47.6 | 54.8 | 48.9 |
| % | Tv_A | 72.7 | 71.7 | 72.2 | 72.9 | 73.7 | 72.5 | 73.7 | 71.1 | 72.8 | 73.2 | 72.6 | 73.9 |
| % | Te | 41.9 | 40.2 | 41.3 | 42.3 | 43.4 | 41.3 | 43.7 | 39.3 | 42.2 | 42.7 | 41.2 | 43.3 |
| % | Tuv | 11.9 | 11.8 | 11.6 | 11.5 | 11.4 | 11.4 | 11.0 | 11.1 | 11.3 | 11.2 | 11.6 | 11.6 |
| nm | Dw | 516.7 | 512.4 | 517.4 | 522.6 | 522.0 | 514.8 | 527.7 | 512.1 | 523.4 | 529.0 | 516.0 | 523.0 |
| % | Pe | 2.6 | 2.9 | 2.7 | 2.7 | 2.6 | 2.7 | 2.8 | 2.9 | 2.8 | 3.0 | 2.7 | 2.6 |
|  | L* | 89.0 | 88.6 | 88.8 | 89.1 | 89.4 | 88.9 | 89.4 | 88.4 | 89.0 | 89.2 | 89.0 | 89.5 |
|  | a* | -9.5 | -10.1 | -9.7 | -9.4 | -9.1 | -9.8 | -9.0 | -10.5 | -9.5 | -9.3 | -9.8 | -9.1 |
|  | b* | 3.6 | 3.3 | 3.7 | 4.0 | 3.8 | 3.5 | 4.1 | 3.4 | 4.1 | 4.4 | 3.6 | 3.9 |

TABLE 3

|  |  | Ex. 25 | Ex. 26 | Ex. 27 | Ex. 28 | Ex. 29 | Ex. 30 | Ex. 31 | Ex. 32 | Ex. 33 | Ex. 34 | Ex. 35 | Ex. 36 |
|---|---|---|---|---|---|---|---|---|---|---|---|---|---|
| mass % | $SiO_2$ | 70.6 | 69.6 | 69.8 | 69.2 | 69.2 | 68.5 | 68.2 | 68.1 | 68.5 | 68.4 | 68.4 | 68.3 |
| mass % | $Al_2O_3$ | 3.2 | 3.2 | 3.2 | 3.2 | 3.2 | 3.2 | 3.2 | 3.2 | 3.1 | 3.2 | 3.2 | 3.2 |
| mass % | MgO | 0.04 | 0.41 | 0.41 | 0.04 | 0.30 | 0.56 | 0.82 | 1.08 | 0.30 | 0.82 | 0.82 | 0.04 |
| mass % | CaO | 8.6 | 8.9 | 8.8 | 8.9 | 8.9 | 9.1 | 9.1 | 9.0 | 9.3 | 9.0 | 8.9 | 9.1 |
| mass % | $Na_2O$ | 13.6 | 13.9 | 13.8 | 14.6 | 14.4 | 14.6 | 14.6 | 14.5 | 14.7 | 14.5 | 14.6 | 14.6 |
| mass % | $K_2O$ | 1.5 | 1.4 | 1.5 | 1.5 | 1.5 | 1.5 | 1.5 | 1.5 | 1.5 | 1.5 | 1.5 | 1.5 |
| mass % | $SO_3$ | 0.03 | 0.03 | 0.03 | 0.02 | 0.03 | 0.03 | 0.04 | 0.03 | 0.03 | 0.04 | 0.04 | 0.05 |
| mass % | t-$Fe_2O_3$ | 0.56 | 0.56 | 0.56 | 0.57 | 0.56 | 0.57 | 0.57 | 0.57 | 0.57 | 0.56 | 0.57 | 0.72 |
| mass % | $TiO_2$ | 0.80 | 0.80 | 0.80 | 0.81 | 0.81 | 0.81 | 0.81 | 0.81 | 0.82 | 0.81 | 0.81 | 1.02 |
| mass % | $CeO_2$ | 1.22 | 1.22 | 1.21 | 1.23 | 1.23 | 1.24 | 1.23 | 1.24 | 1.24 | 1.23 | 1.23 | 1.56 |
|  | MgO/RO | 0.005 | 0.044 | 0.044 | 0.004 | 0.033 | 0.058 | 0.083 | 0.107 | 0.031 | 0.083 | 0.084 | 0.004 |
|  | t-$Fe_2O_3$/$TiO_2$ | 0.700 | 0.700 | 0.698 | 0.699 | 0.696 | 0.699 | 0.698 | 0.698 | 0.693 | 0.695 | 0.698 | 0.707 |
|  | A | 31.1 | 30.8 | 34.9 | 37.0 | 33.5 | 35.1 | 35.5 | 36.5 | 37.9 | 34.0 | 31.0 | 31.5 |
| % | Fe-redox | 44.5 | 44.1 | 50.0 | 53.0 | 48.1 | 50.3 | 50.9 | 52.3 | 54.8 | 49.0 | 44.5 | 44.5 |
| % | Tv_A | 74.9 | 74.3 | 72.9 | 72.5 | 73.3 | 72.4 | 71.9 | 71.2 | 71.7 | 72.5 | 73.5 | 68.7 |
| % | Te | 45.3 | 45.0 | 42.5 | 41.3 | 43.2 | 42.1 | 41.5 | 40.8 | 40.5 | 42.5 | 44.4 | 37.6 |
| % | Tuv | 11.5 | 11.0 | 11.0 | 11.4 | 11.1 | 10.9 | 10.6 | 10.3 | 11.2 | 10.7 | 10.7 | 6.1 |
| nm | Dw | 531.6 | 531.3 | 521.1 | 514.8 | 522.6 | 518.0 | 517.2 | 517.3 | 512.7 | 521.0 | 528.7 | 548.0 |
| % | Pe | 2.9 | 3.0 | 2.7 | 2.7 | 2.7 | 2.7 | 2.8 | 2.9 | 2.9 | 2.8 | 2.9 | 6.1 |
|  | L* | 89.9 | 89.7 | 89.1 | 88.9 | 89.3 | 88.9 | 88.7 | 88.4 | 88.6 | 88.9 | 89.3 | 87.0 |
|  | a* | -8.5 | -8.8 | -9.6 | -9.8 | -9.3 | -9.8 | -10.1 | -10.4 | -10.2 | -9.7 | -9.1 | -11.1 |
|  | b* | 4.2 | 4.3 | 3.9 | 3.5 | 3.9 | 3.7 | 3.8 | 3.9 | 3.4 | 4.0 | 4.3 | 7.7 |

TABLE 4

|  |  | Ex. 37 | Ex. 38 | Ex. 39 | Ex. 40 | Ex. 41 | Ex. 42 | Ex. 43 | Ex. 44 | Ex. 45 | Ex. 46 |
|---|---|---|---|---|---|---|---|---|---|---|---|
| mass % | $SiO_2$ | 68.3 | 68.6 | 69.4 | 69.2 | 67.6 | 68.1 | 68.1 | 68.9 | 68.6 | 68.9 |
| mass % | $Al_2O_3$ | 3.2 | 3.2 | 3.2 | 3.2 | 3.2 | 3.2 | 3.2 | 2.7 | 3.4 | 3.5 |
| mass % | MgO | 0.04 | 0.04 | 0.04 | 0.04 | 0.30 | 0.30 | 0.30 | 0.30 | 0.30 |  |
| mass % | CaO | 9.1 | 8.9 | 8.9 | 8.9 | 9.1 | 8.9 | 9.0 | 9.0 | 8.8 | 10.0 |
| mass % | $Na_2O$ | 14.6 | 14.5 | 14.5 | 14.6 | 15.5 | 15.0 | 14.8 | 14.9 | 15.5 | 14.5 |
| mass % | $K_2O$ | 1.5 | 1.5 | 1.5 | 1.5 | 1.7 | 1.9 | 2.1 | 1.6 | 0.7 | 0.3 |

TABLE 4-continued

|  |  | Ex. 37 | Ex. 38 | Ex. 39 | Ex. 40 | Ex. 41 | Ex. 42 | Ex. 43 | Ex. 44 | Ex. 45 | Ex. 46 |
|---|---|---|---|---|---|---|---|---|---|---|---|
| mass % | $SO_3$ | 0.04 | 0.03 | 0.04 | 0.02 | 0.04 | 0.04 | 0.03 | 0.03 | 0.04 |  |
| mass % | $t\text{-}Fe_2O_3$ | 0.72 | 0.72 | 0.56 | 0.57 | 0.57 | 0.56 | 0.57 | 0.57 | 0.57 | 0.54 |
| mass % | $TiO_2$ | 1.02 | 1.02 | 0.80 | 0.81 | 0.81 | 0.80 | 0.81 | 0.81 | 0.80 | 0.31 |
| mass % | $CeO_2$ | 1.55 | 1.44 | 1.23 | 1.23 | 1.24 | 1.23 | 1.23 | 1.23 | 1.22 | 1.85 |
|  | MgO/RO | 0.004 | 0.004 | 0.004 | 0.004 | 0.032 | 0.033 | 0.032 | 0.032 | 0.033 | 0.033 |
|  | $t\text{-}Fe_2O_3/TiO_2$ | 0.703 | 0.707 | 0.705 | 0.699 | 0.701 | 0.701 | 0.701 | 0.700 | 0.716 | 1.742 |
|  | A | 33.4 | 39.9 | 33.8 | 37.0 | 37.9 | 35.8 | 39.5 | 39.8 | 36.3 | 95.8 |
| % | Fe-redox | 47.6 | 56.4 | 47.9 | 53.0 | 54.0 | 51.1 | 56.3 | 56.8 | 50.6 | 55.0 |
| % | Tv_A | 68.0 | 65.5 | 73.7 | 72.5 | 71.7 | 72.6 | 71.2 | 71.2 | 72.3 | 71.4 |
| % | Te | 36.5 | 33.1 | 43.4 | 41.3 | 40.8 | 42.1 | 39.8 | 39.8 | 41.7 | 37.4 |
| % | Tuv | 6.2 | 6.6 | 11.4 | 11.4 | 11.0 | 11.1 | 11.0 | 11.3 | 11.1 | 9.5 |
| nm | Dw | 545.3 | 534.5 | 522.0 | 514.8 | 512.0 | 515.2 | 511.2 | 509.3 | 515.4 | 494 |
| % | Pe | 5.8 | 5.0 | 2.6 | 2.7 | 2.9 | 2.7 | 3.0 | 3.1 | 2.7 |  |
|  | L* | 86.7 | 85.6 | 89.4 | 88.9 | 88.6 | 89.0 | 88.4 | 88.4 | 88.8 |  |
|  | a* | −11.6 | −13.1 | −9.1 | −9.8 | −10.1 | −9.7 | −10.5 | −10.5 | −9.8 |  |
|  | b* | 7.5 | 6.8 | 3.8 | 3.5 | 3.3 | 3.5 | 3.3 | 3.0 | 3.5 |  |

TABLE 5

|  |  | Ex. 47 | Ex. 48 | Ex. 49 | Ex. 50 | Ex. 51 |
|---|---|---|---|---|---|---|
| mass % | $SiO_2$ | 67.8 | 66.7 | 68.7 | 69.8 | 68.9 |
| mass % | $Al_2O_3$ | 2.9 | 4.1 | 3.3 | 3.2 | 1.5 |
| mass % | MgO | 2.34 | 1.56 | 0.04 | 0.04 | 3.09 |
| mass % | CaO | 10.6 | 7.1 | 8.7 | 8.8 | 9.5 |
| mass % | $Na_2O$ | 13.4 | 16.3 | 15.0 | 14.4 | 14.1 |
| mass % | $K_2O$ | 1.3 | 2.0 | 1.5 | 1.5 | 0.7 |
| mass % | $SO_3$ | 0.1 | 0.2 | 0.06 | 0.03 | 0.15 |
| mass % | $t\text{-}Fe_2O_3$ | 0.56 | 0.87 | 0.56 | 0.61 | 0.55 |
| mass % | $TiO_2$ | 0.70 | 0.95 | 1.37 | 0.60 | 0.81 |
| mass % | $CeO_2$ | 0.27 | 0.19 | 0.78 | 1.03 | 0.75 |
|  | MgO/RO | 0.181 | 0.180 | 0.005 | 0.005 | 0.245 |
|  | $t\text{-}Fe_2O_3/TiO_2$ | 0.797 | 0.920 | 0.410 | 1.010 | 0.676 |
|  | A | 31.1 | 35.7 | 22.4 | 51.3 | 20.8 |
| % | Fe-redox | 39.1 | 38.8 | 54.6 | 50.8 | 30.8 |
| % | Tv_A | 75.1 | 66.2 | 71.5 | 72.4 | 76.6 |
| % | Te | 48.3 | 36.5 | 40.0 | 41.4 | 52.5 |
| % | Tuv | 19.7 | 12.6 | 11.0 | 13.9 | 12.4 |
| nm | Dw | 512.6 | 532.6 | 541.6 | 504.1 | 551.2 |
| % | Pe | 2.3 | 4.3 | 4.6 | 3.2 | 2.2 |
|  | L* | 90.1 | 85.9 | 88.3 | 89.0 | 90.6 |
|  | a* | −8.3 | −11.8 | −10.5 | −9.5 | −7.3 |
|  | b* | 2.8 | 5.9 | 6.3 | 2.0 | 5.7 |

The X-ray intensity of each component on the surface of the glass sheet obtained above was measured using an X-ray fluorescence analyzer (XRF) (ZSX100e manufactured by Rigaku Corporation), and quantitative analysis was conducted to confirm the compositions above. The transmittance was measured every 1 nm by a spectrophotometer (U-4100 manufactured by Hitachi High-Technologies Corporation), and Fe-redox was calculated according to formula (1) from the transmittance at a wavelength of 1,000 nm. The optical properties shown in Tables were determined.

It is seen from Tables 1 to 5 that the glass sheets in Ex. 1 to 45 and 47 to 49 maintain high visible light transmittance while having high heat insulating property, i.e., a solar transmittance Te of 50% or less, and have a yellow-green hue represented by the dominant wavelength Dw of 508 to 580 nm.

On the other hand, in the glass sheets of Ex. 46 and 50, although the criterion of heat insulating property is satisfied, since the content of $TiO_2$ is less than 0.65%, Dw is less than 508 nm, and the desired yellow-green hue is not achieved.

In the glass sheet of Ex. 51, since MgO/RO is more than 0.20, the solar transmittance Te is more than 50%, and the criterion of heat insulating property is not satisfied.

Although the present invention has been described in detail and by reference to the specific embodiments, it is apparent to one skilled in the art that various modifications or changes can be made therein without departing from the spirit and scope of the present invention. This application is based on Japanese Patent Application No. 2017-242449 filed Dec. 19, 2017, the contents of which are incorporated herein by reference.

INDUSTRIAL APPLICABILITY

The glass sheet of the present invention allows transmitted light to have a yellow-green hue while satisfying low solar transmittance and high visible light transmittance at the same time. Therefore, the glass sheet is useful as a glass sheet for vehicles and buildings and is suitable, among others, as a glass sheet for automobiles.

The invention claimed is:
1. A glass sheet comprising, as represented by mass percentage based on oxides:
   $SiO_2$: from 65 to 75%,
   $Al_2O_3$: from 0 to 20%,
   MgO: from 0 to 5%,
   CaO: from 2 to 20%,
   $Na_2O$: from 5 to 20%,
   $K_2O$: from 0 to 10%,
   total iron in terms of $Fe_2O_3$ ($t\text{-}Fe_2O_3$): from 0.2 to 1.0%,
   $TiO_2$: from 0.65 to 1.5%, and
   $CeO_2$: from 0.1 to 2.0%,
   having a ratio (MgO/RO) of the content of MgO to RO of 0.20 or less, denoting RO as a total amount of MgO, CaO, SrO and BaO as represented by mass percentage based on oxides, having Fe-redox, which is a mass ratio of divalent iron in terms of $Fe_2O_3$ to the total iron in terms of $Fe_2O_3$, of from 30 to 57%, having a visible light transmittance Tv_A specified in JIS R 3106 (1998) of 65% or more in terms of a 3.9-mm thickness of the glass sheet, having a solar transmittance Te specified in ISO-9050 (2003) of 50% or less in terms of a 3.9-mm thickness of the glass sheet, and having a dominant wavelength Dw of transmitted light specified in JIS Z 8701 (1999) of from 508 to 580 nm in terms of a 3.9-mm thickness of the glass sheet, wherein a value of A represented by the following formula is from 20 to 40:

$$A=([t\text{-}Fe_2O_3]\times Fe\text{-}redox)/[TiO_2],$$

wherein $[t\text{-}Fe_2O_3]$ is the content (unit: mass %) of the total iron in terms of $Fe_2O_3$ ($t\text{-}Fe_2O_3$), and $[TiO_2]$ is the content (unit: mass %) of $TiO_2$.

2. The glass sheet according to claim 1, having a ratio ($t\text{-}Fe_2O_3/TiO_2$) of the content of the total iron in terms of $Fe_2O_3$ ($t\text{-}Fe_2O_3$) to the content of $TiO_2$ as represented by mass percentage based on oxides of from 0.3 to 1.1.

3. The glass sheet according to claim 1, wherein the value of A is from 25 to 38.

4. The glass sheet according to claim 1, comprising, as represented by mass percentage based on oxides, from 0.4 to 1.8% of $CeO_2$.

5. The glass sheet according to claim 1, having a ultraviolet transmittance Tuv specified in ISO-9050 (2003) of 20% or less in terms of a 3.9-mm thickness of the glass sheet.

6. The glass sheet according to claim 1, comprising, as represented by mass percentage based on oxides, 1.0% or less of $TiO_2$.

7. The glass sheet according to claim 1, having the Fe-redox of from 45 to 57%.

8. The glass sheet according to claim 1, wherein the value of A is from 20 to 38.

9. The glass sheet according to claim 1, having a ratio ($t\text{-}Fe_2O_3/TiO_2$) of the content of the total iron in terms of $Fe_2O_3$ ($t\text{-}Fe_2O_3$) to the content of $TiO_2$ as represented by mass percentage based on oxides of from 0.3 to 0.75.

10. The glass sheet according to claim 1, having a ratio ($t\text{-}Fe_2O_3/TiO_2$) of the content of the total iron in terms of $Fe_2O_3$ ($t\text{-}Fe_2O_3$) to the content of $TiO_2$ as represented by mass percentage based on oxides of from 0.3 to 0.724.

11. The glass sheet according to claim 1, comprising, as represented by mass percentage based on oxides, 0.81% or more of $TiO_2$.

12. The glass sheet according to claim 1, comprising, as represented by mass percentage based on oxides, 0.90% or more of $TiO_2$.

13. The glass sheet according to claim 1, comprising, as represented by mass percentage based on oxides, 0.55% or more of the total iron in terms of $Fe_2O_3$ ($t\text{-}Fe_2O_3$).

14. The glass sheet according to claim 1, having the dominant wavelength Dw of from 510 to 580 nm in terms of a 3.9-mm thickness of the glass sheet.

* * * * *